US012768006B2

(12) United States Patent
Zaizen et al.

(10) Patent No.: US 12,768,006 B2
(45) **Date of Patent: *Oct. 20, 2026**

(54) NON-ORIENTED ELECTRICAL STEEL SHEET AND METHOD OF PRODUCING SAME

(71) Applicant: JFE STEEL CORPORATION, Tokyo (JP)

(72) Inventors: Yoshiaki Zaizen, Tokyo (JP); Takeshi Nishiyama, Tokyo (JP); Nobuko Nakagawa, Tokyo (JP); Tomoyuki Okubo, Tokyo (JP); Tomohiro Aoyama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 278 days.

This patent is subject to a terminal disclaimer.

(21) Appl. No.: 18/729,166

(22) PCT Filed: Jan. 20, 2023

(86) PCT No.: PCT/JP2023/001793
§ 371 (c)(1),
(2) Date: Jul. 16, 2024

(87) PCT Pub. No.: WO2023/149249
PCT Pub. Date: Aug. 10, 2023

(65) Prior Publication Data

US 2025/0179601 A1 Jun. 5, 2025

(30) Foreign Application Priority Data

Feb. 2, 2022 (JP) ................................ 2022-015255

(51) Int. Cl.
*C21D 9/46* (2006.01)
*C21D 1/74* (2006.01)
(Continued)

(52) U.S. Cl.
CPC ................ *C21D 9/46* (2013.01); *C21D 1/74* (2013.01); *C21D 6/001* (2013.01); *C21D 6/002* (2013.01);
(Continued)

(58) Field of Classification Search
CPC .................................................... C22C 38/001
See application file for complete search history.

(56) References Cited

U.S. PATENT DOCUMENTS

2015/0318092 A1* 11/2015 Shingaki ............. C21D 8/1222 148/307
2020/0190639 A1* 6/2020 Nakajima .............. B21C 47/02
(Continued)

FOREIGN PATENT DOCUMENTS

EP 3916113 A1 12/2021
JP H11343544 A 12/1999
(Continued)

OTHER PUBLICATIONS

Apr. 4, 2025, the Extended European Search Report issued by the European Patent Office in the corresponding European Patent Application No. 23749565.0.
(Continued)

*Primary Examiner* — Ian A Rummel
(74) *Attorney, Agent, or Firm* — KENJA IP LAW PC

(57) ABSTRACT

Provided is a non-oriented electrical steel sheet with low high-frequency iron loss without addition of a large amount of alloying elements such as Cr, which causes a decrease in magnetic flux density, and without reduction of the sheet thickness, which causes a decrease in productivity. A non-oriented electrical steel sheet comprises a certain chemical composition containing 0.0005 mass % to 0.0050 mass % of Co, wherein at at least one surface of the non-oriented electrical steel sheet, an amount of N existing as AlN in a
(Continued)

range from the surface to a depth of 1/20 of a sheet thickness is 0.003 mass % or less, and the surface has an oxide layer containing one or both of Al and Si and having a thickness of 10 nm or more and less than 80 nm.

8 Claims, 3 Drawing Sheets

(51) Int. Cl.

| | |
|---|---|
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/10*** | (2006.01) |
| ***C22C 38/12*** | (2006.01) |
| ***C22C 38/14*** | (2006.01) |
| ***C22C 38/16*** | (2006.01) |
| ***C22C 38/26*** | (2006.01) |
| ***C22C 38/28*** | (2006.01) |
| ***C22C 38/30*** | (2006.01) |
| ***C22C 38/34*** | (2006.01) |
| ***C22C 38/48*** | (2006.01) |
| ***C22C 38/50*** | (2006.01) |
| ***C22C 38/52*** | (2006.01) |
| ***C22C 38/60*** | (2006.01) |
| ***H01F 1/147*** | (2006.01) |

(52) U.S. Cl.

CPC ............. *C21D 6/004* (2013.01); *C21D 6/005* (2013.01); *C21D 6/007* (2013.01); *C21D 6/008* (2013.01); *C21D 8/1222* (2013.01); *C21D 8/1233* (2013.01); *C21D 8/1255* (2013.01); *C21D 8/1261* (2013.01); *C21D 8/1277* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/26* (2013.01); *C22C 38/28* (2013.01); *C22C 38/30* (2013.01); *C22C 38/34* (2013.01); *C22C 38/48* (2013.01); *C22C 38/50* (2013.01); *C22C 38/52* (2013.01); *C22C 38/60* (2013.01); *H01F 1/14791* (2013.01); *C22C 2202/02* (2013.01)

(56) References Cited

U.S. PATENT DOCUMENTS

| | | | |
|---|---|---|---|
| 2022/0056548 | A1 | 2/2022 | Zaizen et al. |
| 2022/0278566 | A1 | 9/2022 | Zaizen et al. |
| 2023/0045797 | A1 | 2/2023 | Lee et al. |

FOREIGN PATENT DOCUMENTS

| | | | |
|---|---|---|---|
| JP | 2006241563 | A | 9/2006 |
| JP | 2007291491 | A | 11/2007 |
| JP | 2019014927 | A | 1/2019 |
| KR | 1020210080657 | A | 7/2021 |
| WO | 2020136993 | A1 | 7/2020 |
| WO | 2020262063 | A1 | 12/2020 |

OTHER PUBLICATIONS

Apr. 11, 2023, International Search Report issued in the International Patent Application No. PCT/JP2023/001793.

Jul. 23, 2024, Notification of Reasons for Refusal issued by the Japan Patent Office in the corresponding Japanese Patent Application No. 2023-528195 with English language concise statement of relevance.

* cited by examiner

NON-ORIENTED ELECTRICAL STEEL SHEET AND METHOD OF PRODUCING SAME

TECHNICAL FIELD

The present disclosure relates to a non-oriented electrical steel sheet and a method of producing the same.

BACKGROUND

In recent years, energy saving is required due to consideration for the environment such as global warming. In the automotive field, hybrid electric vehicles (HEVs) that use both an engine and a motor, electric vehicles (EVs) driven only by an electric motor, fuel cell electric vehicles (FCEVs), etc. are being developed. The motors used in these vehicles are typically driven in a high frequency range which is advantageous for high speed rotation, in order to enhance efficiency. Non-oriented electrical steel sheets are often used as an iron core material for such drive motors of HEVs and EVs. In order to achieve high motor efficiency, non-oriented electrical steel sheets are strongly required to have lower iron loss in the high frequency range.

Conventionally, the iron loss of non-oriented electrical steel sheets is reduced mainly by adding alloying elements such as Si and Al to enhance specific resistance or by reducing the sheet thickness to reduce eddy current loss. However, when a large amount of alloying elements are added for iron loss reduction, saturation magnetic flux density decreases. A decrease in magnetic flux density causes an increase in copper loss in the motor, leading to lower motor efficiency. Moreover, in order to reduce the thickness of the non-oriented electrical steel sheet, it is necessary to reduce the thickness of the hot-rolled steel sheet or increase the cold rolling reduction in the production process. This lowers productivity.

Accordingly, if a non-oriented electrical steel sheet that has both high magnetic flux density and low iron loss in the high frequency range and also has excellent productivity can be developed, it will greatly contribute to higher efficiency of electric devices.

As a method of achieving low iron loss in the high frequency range, for example, JP H11-343544 A (PTL 1) discloses a method in which 1.5 mass % to 20 mass % of Cr is added to enhance the specific resistance of steel and achieve low iron loss in the high frequency range.

CITATION LIST

Patent Literature

PTL 1: JP H11-343544 A

SUMMARY

Technical Problem

However, since Cr is an element that decreases saturation magnetic flux density, the technique disclosed in PTL 1, which requires the addition of a large amount of Cr, cannot achieve both high magnetic flux density and low high-frequency iron loss.

It could therefore be helpful to provide a non-oriented electrical steel sheet with reduced iron loss in a high frequency range without addition of a large amount of alloying elements such as Cr, which causes a decrease in magnetic flux density, and without reduction of the sheet thickness, which causes a decrease in productivity.

Solution to Problem

Upon careful examination focusing on the influence of the surface state of a non-oriented electrical steel sheet on its magnetic properties, we discovered that, by limiting the Co content in the steel to a certain range and subjecting the steel sheet after cold rolling and before final annealing to acidizing to limit the nitrogen amount in the surface layer to a certain range, iron loss can be reduced without causing a decrease in magnetic flux density.

The present disclosure is based on these discoveries. We thus provide the following.

1. A non-oriented electrical steel sheet comprising a chemical composition containing (consisting of), in mass %, C: 0.0050% or less, Si: 2.0% to 6.5%, Mn: 0.05% to 2.0%, P: 0.10% or less, S: 0.0050% or less, Al: 0.3% to 3.0%, N: 0.0050% or less, Co: 0.0005% to 0.0050%, Ti: 0.0030% or less, Nb: 0.0030% or less, and O: 0.0050% or less, with a balance consisting of Fe and inevitable impurities, wherein at at least one surface of the non-oriented electrical steel sheet, an amount of N existing as AlN in a range from the surface to a depth of 1/20 of a sheet thickness is 0.003 mass % or less, and the surface has an oxide layer containing one or both of Al and Si and having a thickness of 10 nm or more and less than 80 nm.

2. The non-oriented electrical steel sheet according to 1., wherein a Si concentration in the oxide layer is 12 at % or more.

3. The non-oriented electrical steel sheet according to 1, or 2., wherein the chemical composition further contains, in mass %, one or more groups out of the following groups A to F:

group A: one or both of Sn: 0.005% to 0.20% and Sb: 0.005% to 0.20%, group B: at least one selected from the group consisting of Ca, Mg, and REM: 0.0005% to 0.020% in total, group C: at least one selected from the group consisting of Cu, Cr, and Ni: 0.03% to 1.0% in total, group D: one or both of Ge and Ga: 0.0005% to 0.01% in total, group E: Zn: 0.001% to 0.05%, and group F: one or both of Mo and W: 0.001% to 0.05% in total.

4. A method of producing a non-oriented electrical steel sheet, the method comprising: subjecting a steel material to cold rolling once or twice or more with intermediate annealing therebetween to obtain a cold-rolled steel sheet, the steel material having a chemical composition containing, in mass %, C: 0.0050% or less, Si: 2.0% to 6.5%, Mn: 0.05% to 2.0%, P: 0.10% or less, S: 0.0050% or less, Al: 0.3% to 3.0%, N: 0.0050% or less, Co: 0.0005% to 0.0050%, Ti: 0.0030% or less, Nb: 0.0030% or less, and O: 0.0050% or less, with a balance consisting of Fe and inevitable impurities; subjecting the cold-rolled steel sheet to final annealing to produce a non-oriented electrical steel sheet; and subjecting, after the cold rolling and before the final annealing, a surface of the steel sheet to acidizing for 1 second to 60 seconds using an acid containing at least one selected from the group consisting of hydrochloric acid, phosphoric acid, sulfuric acid, and nitric acid at a total concentration of 3 wt % to 30 wt %.

5. The method of producing a non-oriented electrical steel sheet according to 4., comprising: subjecting, before the cold rolling, the steel material to hot rolling to obtain a hot-rolled steel sheet; and subjecting the hot-rolled steel sheet to hot-rolled sheet annealing to obtain a hot-rolled and annealed sheet, wherein the hot-rolled and annealed sheet is subjected to the cold rolling.

6. The method of producing a non-oriented electrical steel sheet according to 4, or 5., wherein the chemical composition further contains, in mass %, one or more groups out of the following groups A to F:

group A: one or both of Sn: 0.005% to 0.20% and Sb: 0.005% to 0.20%, group B: at least one selected from the group consisting of Ca, Mg, and REM: 0.0005% to 0.020% in total, group C: at least one selected from the group consisting of Cu, Cr, and Ni: 0.03% to 1.0% in total, group D: one or both of Ge and Ga: 0.0005% to 0.01% in total, group E: Zn: 0.001% to 0.05%, and group F: one or both of Mo and W: 0.001% to 0.05% in total.

Advantageous Effect

It is thus possible to provide a non-oriented electrical steel sheet with reduced iron loss in a high frequency range without causing a decrease in magnetic flux density or productivity. In detail, since low high-frequency iron loss can be achieved by adding a small amount of Co and controlling the nitrogen amount in the surface layer by acidizing, addition of a large amount of alloying elements such as Cr, which causes a decrease in magnetic flux density, is unnecessary. Moreover, excellent magnetic properties can be achieved without reduction of the sheet thickness, which causes a decrease in productivity.

DETAILED DESCRIPTION

First, experiments that led to development of the presently disclosed techniques will be described. In the specification, "%" as a unit of content refers to "mass %" unless otherwise specified. The unit of acid concentration is "wt %".

Experiment 1

A plurality of non-oriented electrical steel sheets with different Co contents were each produced according to the following procedure, and the iron loss in the high frequency range of each of the obtained non-oriented electrical steel sheets was evaluated.

Steel containing C: 0.0024%, Si: 3.3%, Mn: 0.8%, P: 0.01%, S: 0.0018%, Al: 0.7%, N: 0.0021%, Ti: 0.0011%, Nb: 0.0007%, O: 0.0020%, and Co: 0.0001% to 0.01% with the balance consisting of Fe and inevitable impurities was obtained by steelmaking in a vacuum furnace and cast into a steel ingot. The steel ingot was hot rolled to obtain a hot-rolled steel sheet with a sheet thickness of 2.0 mm, and the hot-rolled steel sheet was subjected to hot-rolled sheet annealing at 950° C. for 30 seconds to obtain a hot-rolled and annealed sheet. The hot-rolled and annealed sheet was pickled and then cold rolled to obtain a cold-rolled steel sheet with a final sheet thickness of 0.25 mm.

The obtained cold-rolled steel sheet was subjected to acidizing that involves immersing in 10% hydrochloric acid for 10 seconds. The cold-rolled steel sheet was then subjected to final annealing at 1000° C. for 10 seconds in an atmosphere of $H_2$:$N_2$=15:85 in vol % to obtain a non-oriented electrical steel sheet.

Figure 1:
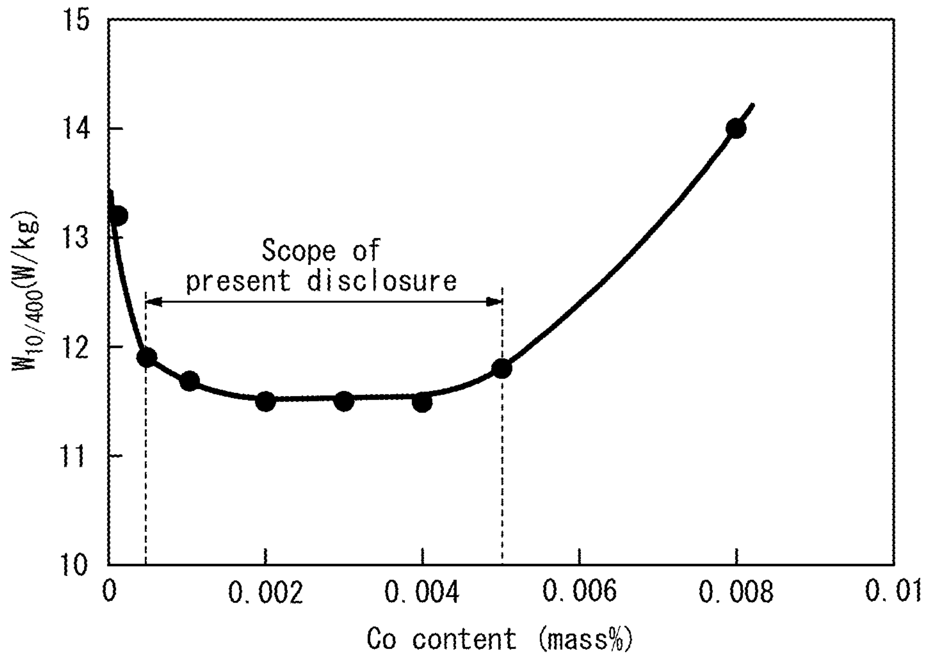
FIG. 1 is a graph illustrating the correlation between Co content and high-frequency iron loss ($W_{10/400}$)

Test pieces of 30 mm in width and 180 mm in length were cut out from the rolling direction (L direction) and transverse direction (C direction) of the non-oriented electrical steel sheet obtained in the foregoing manner, and the high-frequency iron loss of the test pieces was evaluated. Specifically, the iron loss $W_{10/400}$ of the test pieces in the (L+C) direction at a maximum magnetic flux density of 1.0 T and a frequency of 400 Hz was measured by Epstein testing. FIG. 1 illustrates the correlation between the Co content and the measured $W_{10/400}$.

As can be seen from the results illustrated in FIG. 1, the iron loss decreased significantly when the Co content was in the range of 0.0005% to 0.0050%.

In order to investigate the cause of the decrease in iron loss by the addition of a small amount of Co, a section in the rolling direction of each non-oriented electrical steel sheet produced in the above experiment was observed using a scanning electron microscope (SEM). As a result, in each non-oriented electrical steel sheet having a Co content outside the range of 0.0005% to 0.0050%, precipitation of fine AlN was observed in the range from the surface of the steel sheet to a depth of 1/20 of the sheet thickness (hereafter also referred to as "surface layer"). In each non-oriented electrical steel sheet having a Co content in the range of 0.0005% to 0.0050%, on the other hand, AlN hardly precipitated in the surface layer.

Typically, in the production process of a non-oriented electrical steel sheet, nitrogen in the atmosphere diffuses into the steel sheet during final annealing, resulting in the formation of nitrides such as AlN in the surface layer (such a surface layer into which nitrides have precipitated is also referred to as "nitrided layer"). However, the above experimental results suggest that, in each non-oriented electrical steel sheet having a Co content in the range of 0.0005% to 0.0050%, the amount of nitrides (AlN) in the surface layer was reduced for some reason and consequently the iron loss decreased.

Figure 2:
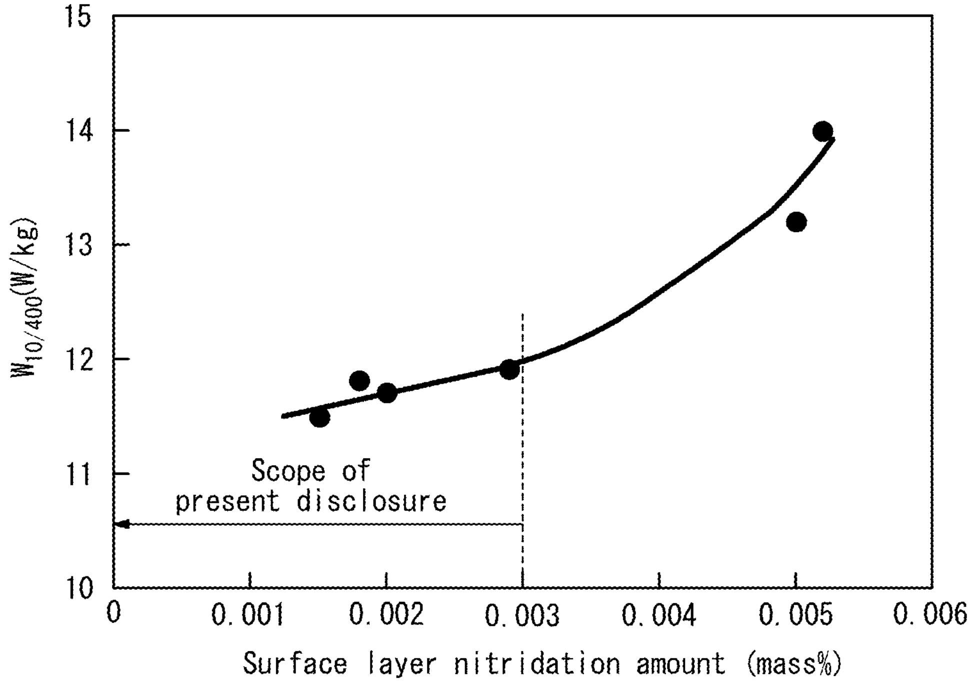
FIG. 2 is a graph illustrating the correlation between surface layer nitridation amount and high-frequency iron loss ($W_{10/400}$)

Then, the concentration of N existing as AlN in the range from the surface of the non-oriented electrical steel sheet to a depth of 1/20 of the sheet thickness (hereafter referred to as "surface layer nitridation amount") was analyzed by electrolytic extraction. FIG. 2 illustrates the correlation between the measured surface layer nitridation amount and $W_{10/400}$.

As can be seen from the results illustrated in FIG. 2, there was a strong correlation between the surface layer nitridation amount and the iron loss. In particular, the iron loss decreased significantly when the surface layer nitridation amount was 0.003% or less. Thus, the iron loss decreased as a result of reduction in the amount of AlN, as mentioned above. In all steel sheets having a surface layer nitridation amount of 0.003% or less, the Co content was in the range of 0.0005% to 0.0050%.

Further, the surface of each non-oriented electrical steel sheet that was found to have decreased in iron loss was observed using a transmission electron microscope (TEM). The observation revealed that an oxide layer containing one or both of Al and Si and having a thickness of 10 nm or more and less than 80 nm was formed at the surface.

From these experimental results, the reason why the iron loss decreased in each steel sheet containing a small amount of Co and acidized before final annealing is considered to be because the oxide layer formed by acidizing and the added Co inhibited nitridation during final annealing. In other words, the oxide layer seems to have functioned as a nitridation inhibiting layer.

Experiment 2

Next, in order to evaluate the influence of the acidizing conditions on the magnetic properties of non-oriented electrical steel sheets, acidizing was performed under various conditions and the high-frequency iron loss of each of the obtained non-oriented electrical steel sheets was measured.

Specifically, first, steel containing C: 0.0025%, Si: 3.5%, Mn: 0.5% P: 0.01%, S: 0.0021%, Al: 0.9%, N: 0.0022%, Ti: 0.0011%, Nb: 0.0007 00 O: 0.0020%, and Co: 0.0023% with the balance consisting of Fe and inevitable impurities was obtained by steelmaking in a vacuum furnace and cast into a steel ingot. The steel ingot was hot rolled to obtain a hot-rolled steel sheet with a sheet thickness of 1.8 mm, and the hot-rolled steel sheet was subjected to hot-rolled sheet annealing at 980° C. for 30 seconds to obtain a hot-rolled and annealed sheet. The hot-rolled and annealed sheet was pickled and then cold rolled to obtain a cold-rolled steel sheet with a final sheet thickness of 0.20 mm.

The obtained cold-rolled steel sheet was sequentially subjected to acidizing and final annealing to obtain a non-oriented electrical steel sheet. The acidizing was performed by immersing the steel sheet in hydrochloric acid for 10 seconds. Here, the concentration of the hydrochloric acid used was varied in the range of 1% to 50%. The final annealing was performed at 1030° C. for 10 seconds in an atmosphere of $H_2$:$N_2$=20:80 in vol %.

Figure 3:
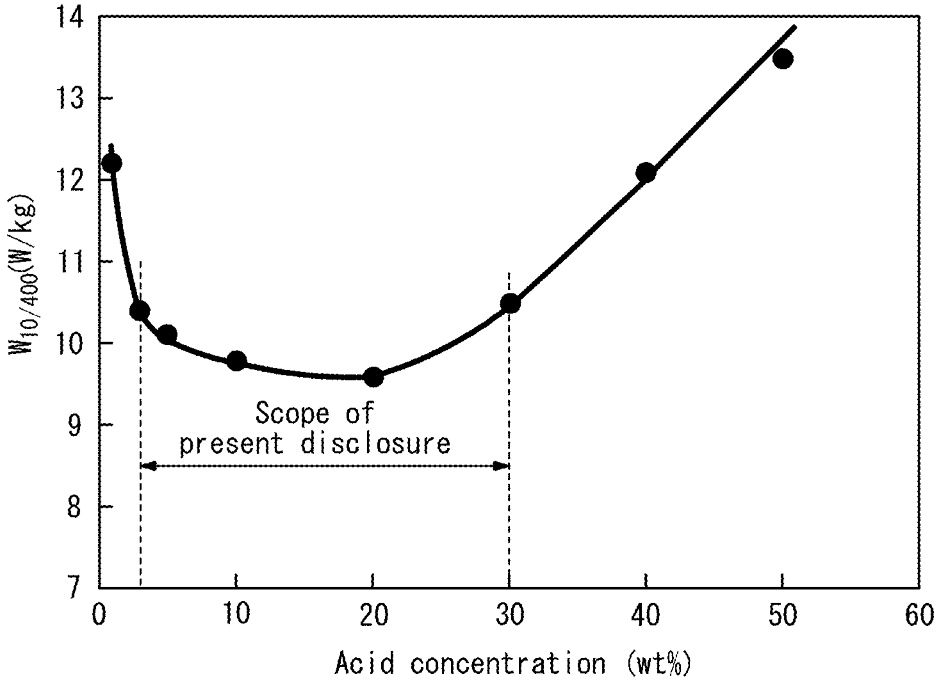
FIG. 3 is a graph illustrating the correlation between acid concentration and high-frequency iron loss ($W_{10/400}$)
Figure 4:
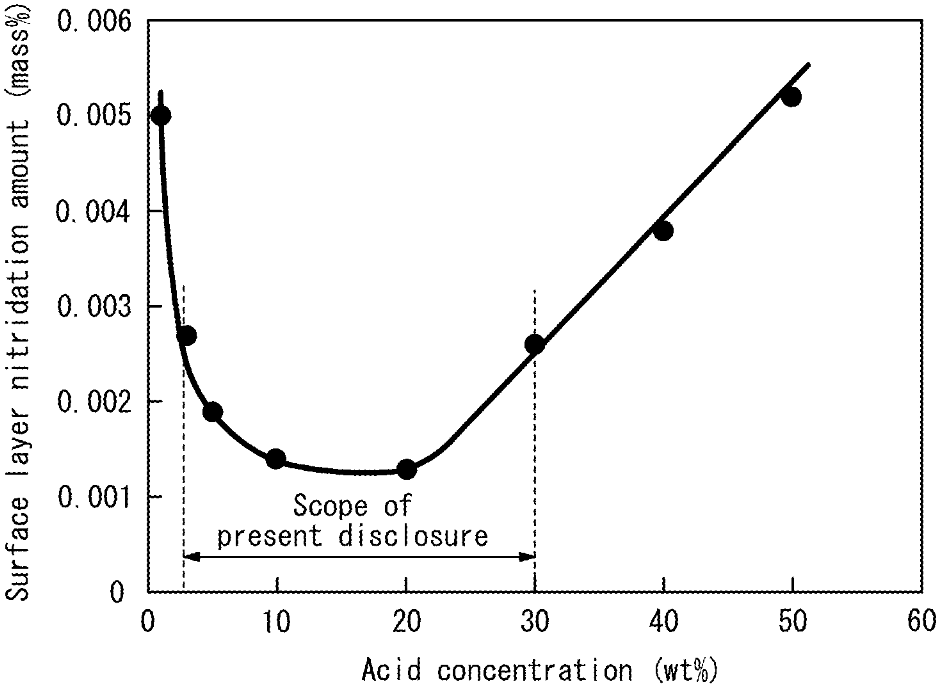
FIG. 4 is a graph illustrating the correlation between acid concentration and surface layer nitridation amount.

Test pieces of 30 mm in width and 180 mm in length were cut out from the rolling direction (L direction) and transverse direction (C direction) of the non-oriented electrical steel sheet obtained in the foregoing manner, and the high-frequency iron loss ($W_{10/400}$) of the test pieces was evaluated. Specifically, the iron loss $W_{10/400}$ of the test pieces in the (L+C) direction at a maximum magnetic flux density of 1.0 T and a frequency of 400 Hz was measured by Epstein testing. Moreover, the concentration of N existing as AlN in the range from the surface of the non-oriented electrical steel sheet to a depth of 1/20 of the sheet thickness was measured by electrolytic extraction. FIGS. 3 and 4 illustrate the measurement results.

Experiment 3

Figure 5:
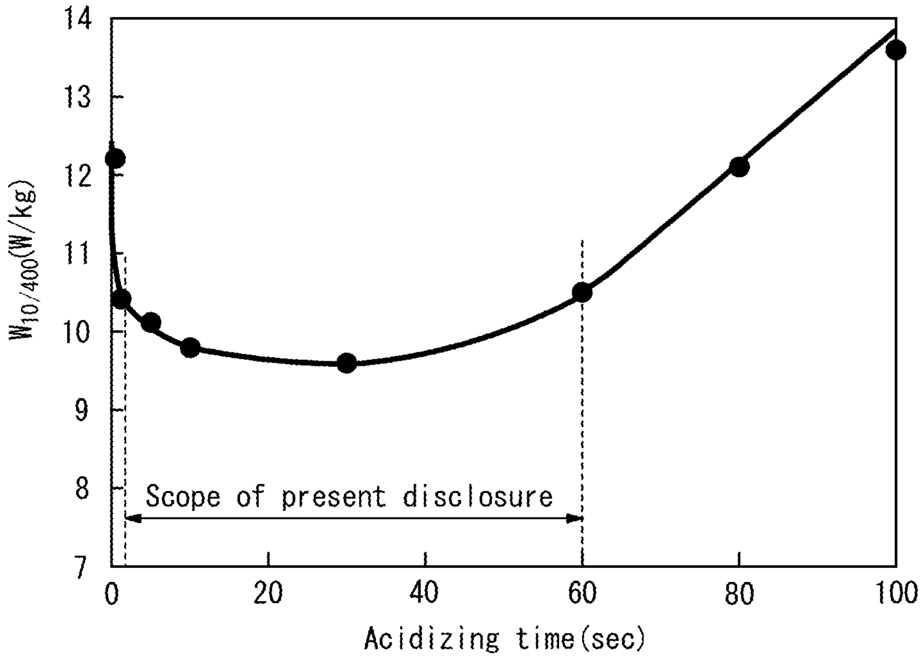
FIG. 5 is a graph illustrating the correlation between acidizing time and high-frequency iron loss ($W_{10/400}$)
Figure 6:
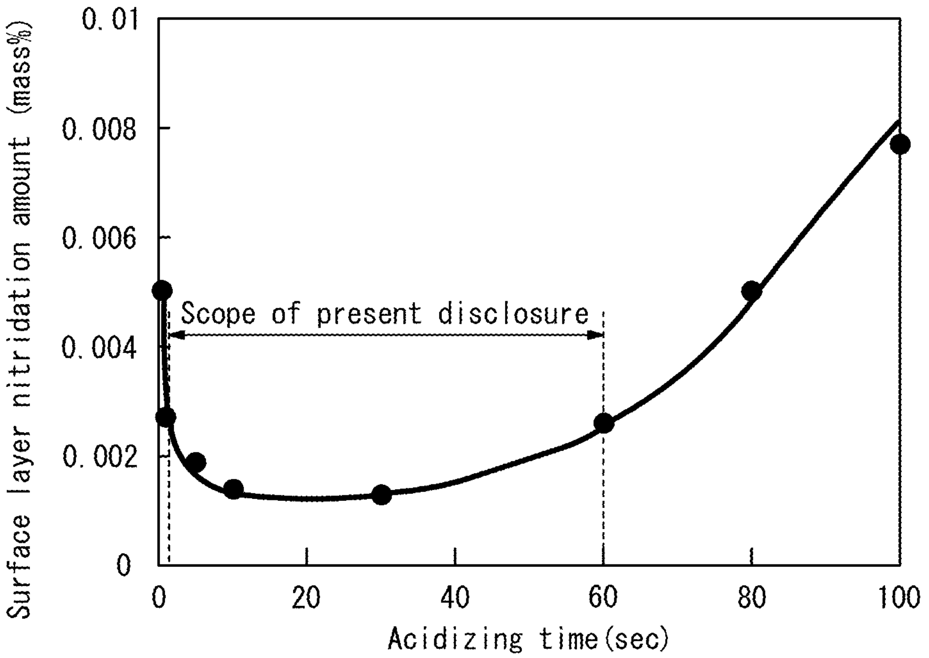
FIG. 6 is a graph illustrating the correlation between acidizing time and surface layer nitridation amount.

Furthermore, non-oriented electrical steel sheets were produced in the same manner as in Experiment 2 except that the concentration of hydrochloric acid in acidizing was 20% and the acidizing time (immersion time) was varied in the range of 0.5 seconds to 100 seconds, and the high-frequency iron loss ($W_{10/400}$) and the surface layer nitridation amount were measured. FIGS. 5 and 6 illustrate the measurement results.

As can be seen from the results illustrated in FIGS. 3 to 6, the high-frequency iron loss decreased significantly when the acid concentration was 3% to 30% and when the acidizing time was 1 second to 60 seconds. When the acid concentration was less than 3% or the acidizing time was less than 1 second, the iron loss remained high despite acidizing being performed. This is considered to be because, in the case where the acid concentration was low and in the case where the acidizing time was short, a sufficient oxide layer was not formed at the surface of the steel sheet and consequently the effect of inhibiting nitridation during final annealing was insufficient. When the acid concentration was more than 30% or the acidizing time was more than 60 seconds, too, the iron loss remained high. This is considered to be because, in the case where the acid concentration was high and in the case where the acidizing time was long, the formation of an oxide film progressed excessively during acidizing and such an oxide film rather promoted nitridation during final annealing.

The present disclosure is based on these discoveries. Embodiments of the present disclosure will be described in detail below, although the present disclosure is not limited to such embodiments.

[Chemical Composition]

The reasons for limiting the chemical composition of the non-oriented electrical steel sheet to the foregoing range in the present disclosure will be described.

C: 0.0050% or Less

C is a harmful element that degrades iron loss by magnetic aging. In detail, if the C content is excessively high, C forms carbides that precipitate over time, causing an increase in iron loss. The C content is therefore limited to 0.0050% or less. The C content is preferably 0.0040% or less. Although no lower limit is placed on the C content, the C content is preferably 0.0001% or more from the viewpoint of reducing the decarburization costs in the refining process.

Si: 2.0% to 6.5%

Si is an element that has the effect of enhancing the specific resistance of steel and reducing iron loss. Si also has the effect of enhancing the strength of steel through solid solution strengthening. In order to achieve these effects, the Si content is 2.0% or more, and preferably 2.5% or more. If the Si content is more than 6.5%, slab cracking is likely to occur during production, resulting in decreased productivity. The Si content is therefore 6.5% or less, and preferably 6.0% or less.

Mn: 0.05% to 2.0%

Mn is an element that has the effect of enhancing the specific resistance of steel and reducing iron loss, as with Si. Mn also has the effect of forming sulfides and improving hot brittleness. In order to achieve these effects, the Mn content is 0.05% or more, and preferably 0.1% or more. If the Mn content is more than 2.0%, slab cracking is likely to occur during production, resulting in decreased productivity. The Mn content is therefore 2.0% or less, and preferably 1.5% or less.

P: 0.10% or Less

If the P content is excessively high, cold rollability degrades. The P content is therefore 0.10% or less, and preferably 0.05% or less. No lower limit is placed on the P content, and the lower limit may be 0%. However, since P is an element that is highly effective in enhancing specific resistance and reducing eddy current loss, P may be optionally added within the foregoing range. From the viewpoint of reducing eddy current loss, the P content is preferably 0.001% or more and more preferably 0.003% or more.

S: 0.0050% or Less

S forms sulfides as precipitates and inclusions and decreases productivity (hot rollability) and the magnetic properties of the non-oriented electrical steel sheet. The S content is therefore 0.0050% or less, and preferably 0.0030% or less. Since a lower S content is better, no lower limit is placed on the S content, and the lower limit may be 0%. Excessively reducing the S content, however, causes an increase in production costs, and accordingly the S content is preferably 0.0001% or more and more preferably 0.0005% or more.

Al: 0.3% to 3.0%

Al is an element that has the effect of enhancing the specific resistance of steel and reducing iron loss, as with Si. If the Al content is more than 3.0%, however, the steel becomes brittle and slab cracking is likely to occur during production. The Al content is therefore 3.0% or less, preferably 2.0% or less, and more preferably 1.5% or less. If the Al content is less than 0.3%, Al forms fine nitrides that precipitate, causing an increase in iron loss. The Al content is therefore 0.3% or more, and preferably 0.4% or more.

N: 0.0050% or Less

N is a harmful element that forms nitrides and degrades magnetic properties. The N content is therefore 0.0050% or less, and preferably 0.0040% or less. Since a lower N content is better, no lower limit is placed on the N content, and the lower limit may be 0%. Excessively reducing the N content, however, causes an increase in production costs, and accordingly the N content is preferably 0.0005% or more and more preferably 0.0010% or more.

Co: 0.0005% to 0.0050%

Co is an element that has the effect of inhibiting nitridation of the surface layer of the steel sheet during final annealing, as mentioned above. The Co content is therefore 0.0005% or more, and preferably 0.001% or more. If the Co content is more than 0.0050%, the formation of an oxide film progresses during acidizing, as a result of which nitridation during final annealing is promoted. The Co content is therefore 0.0050% or less, and preferably 0.0040% or less.

Ti: 0.0030% or Less

Ti is a harmful element that forms fine carbonitrides that precipitate and increases iron loss. The adverse effect of Ti is particularly noticeable when the Ti content is more than 0.0030%. The Ti content is therefore 0.0030% or less, and preferably 0.0020% or less. Since a lower Ti content is better, no lower limit is placed on the Ti content, and the lower limit may be 0%. Excessively reducing the Ti content, however, causes an increase in production costs, and accordingly the Ti content is preferably 0.0001% or more and more preferably 0.0005% or more.

Nb: 0.0030% or Less

Nb is a harmful element that forms fine carbonitrides that precipitate and increases iron loss. The adverse effect of Nb is particularly noticeable when the Nb content is more than 0.0030%. The Nb content is therefore 0.0030% or less, and preferably 0.0020% or less. Since a lower Nb content is better, no lower limit is placed on the Nb content, and the lower limit may be 0%. Excessively reducing the Nb content, however, causes an increase in production costs, and accordingly the Nb content is preferably 0.0001% or more and more preferably 0.0005% or more.

O: 0.0050% or Less

O is a harmful element that forms oxides and degrades magnetic properties. The O content is therefore limited to 0.0050% or less. The O content is preferably 0.0040% or less. Since a lower O content is better, no lower limit is placed on the O content, and the lower limit may be 0%. Excessively reducing the O content, however, causes an increase in production costs, and accordingly the O content is preferably 0.0005% or more and more preferably 0.0010% or more.

A non-oriented electrical steel sheet in one embodiment of the present disclosure has a chemical composition containing the above-described components with the balance consisting of Fe and inevitable impurities.

(Group A)

The chemical composition may optionally further contain one or both of Sn and Sb in the following amounts.

Sn: 0.005% to 0.20%

Sn is an element that has the effect of improving recrystallized texture and improving magnetic flux density and iron loss. In the case of adding Sn, the Sn content is 0.005% or more in order to achieve the effect. If the Sn content is more than 0.20%, the effect is saturated. The Sn content is therefore 0.20% or less.

Sb: 0.005% to 0.20%

Sb is an element that has the effect of improving recrystallized texture and improving magnetic flux density and iron loss, as with Sn. In the case of adding Sb, the Sb content is 0.005% or more in order to achieve the effect. If the Sb content is more than 0.20%, the effect is saturated. The Sb content is therefore 0.20% or less.

(Group B)

The chemical composition may optionally further contain at least one selected from the group consisting of Ca, Mg, and REM (rare earth metal) in the following amount.

Ca, Mg, REM: 0.0005% to 0.020% in Total

Ca, Mg, and REM are components that have the effect of forming stable sulfides and improving grain growth. In the case of adding at least one selected from the group consisting of Ca, Mg, and REM, the total content of Ca, Mg, and REM is 0.0005% or more in order to achieve the effect. If the total content is more than 0.020%, the effect is saturated. The total content is therefore 0.020% or less.

(Group C)

The chemical composition may optionally further contain at least one selected from the group consisting of Cu, Cr, and Ni in the following amount.

Cu, Cr, Ni: 0.03% to 1.0% in Total

Cu, Cr, and Ni are elements that have the effect of enhancing the specific resistance of steel and further reducing iron loss. In the case of adding at least one of Cu, Cr, and Ni, the total content of Cu, Cr, and Ni is 0.03% or more in order to achieve the effect. Since excessive addition decreases magnetic flux density, the total content is 1.0% or less.

(Group D)

The chemical composition may optionally further contain one or both of Ge and Ga in the following amount.

Ge, Ga: 0.0005% to 0.01% in Total

Ge and Ga are elements that have the effect of improving texture. In the case of adding one or both of Ge and Ga, the total content of Ge and Ga is 0.0005% or more and preferably 0.0020% or more in order to achieve the effect. If the total content is more than 0.01%, the effect is saturated and the alloy cost increases. The total content is therefore 0.01% or less, and preferably 0.0050% or less.

(Group E)

The chemical composition may optionally further contain Zn in the following amount.

Zn: 0.001% to 0.05%

Zn is an element that has the effect of inhibiting nitridation during final annealing. In the case of adding Zn, the Zn content is 0.001% or more, and preferably 0.002% or more. If the Zn content is more than 0.05%, Zn forms sulfides, causing an increase in iron loss. The Zn content is therefore 0.05% or less, and preferably 0.01% or less.

(Group F)

The chemical composition may optionally further contain one or both of Mo and W in the following amount.

Mo, W: 0.001% to 0.05% in Total

Mo and W are elements that have the effect of improving high-temperature strength. Adding one or both of Mo and W can suppress surface defects (scab) in non-oriented electrical steel sheets. The steel sheet according to the present disclosure is high-alloy steel and its surface is easily-oxidizable, and thus the likelihood of scab caused by surface cracking is high. By adding one or both of Mo and W, such cracking can be suppressed. In the case of adding one or both of Mo and W, the total content of Mo and W is 0.001% or more and preferably 0.005% or more in order to sufficiently achieve the effect. If the total content is more than 0.05%, the effect is saturated and the alloy cost increases. The total content is therefore 0.05% or less, and preferably 0.020% or less.

[Nitrides]

Surface Layer Nitridation Amount: 0.003% or Less

As demonstrated in the foregoing experiments, there is a strong correlation between the surface layer nitridation amount and the high-frequency iron loss, and the iron loss decreases significantly when the surface layer nitridation amount is 0.003% or less. Hence, in the present disclosure, the surface layer nitridation amount at at least one surface (i.e. at least one side) of the non-oriented electrical steel sheet is 0.003% or less. Since a lower surface layer nitridation amount is better from the viewpoint of reducing the high-frequency iron loss, no lower limit is placed on the surface layer nitridation amount, and the lower limit may be 0%. From the viewpoint of production, however, the surface layer nitridation amount may be 0.0001% or more, and may be 0.0005% or more. The "surface layer nitridation amount" herein refers to the amount of N existing as AlN in the range from the surface of the non-oriented electrical steel sheet to a depth of 1/20 of the sheet thickness. The surface layer nitridation amount can be measured by electrolytic extraction analysis. More specifically, the surface layer nitridation amount can be measured by the method described in the EXAMPLES section. It is preferable that the surface layer nitridation amount at both surfaces (sides) of the non-oriented electrical steel sheet satisfies the foregoing condition.

[Oxide layer]

The non-oriented electrical steel sheet according to the present disclosure has, at at least one surface, an oxide layer containing one or both of Al and Si and having a thickness of 10 nm or more and less than 80 nm. The oxide layer is formed by acidizing before final annealing, as described later.

The oxide layer may contain Al oxide and/or Si oxide. The oxide layer may optionally further contain other elements, for example, at least one selected from Fe, Co, and Mn. In the case where the oxide layer contains Fe, the Fe concentration in the oxide layer is not limited but is preferably less than 100 mass % relative to the total concentration of Al and Si.

Thickness of Oxide Layer: 10 nm or More and Less than 80 nm

The thickness of the oxide layer is 10 nm or more, from the viewpoint of inhibiting nitridation. If the oxide layer is excessively thick, not only nitridation is rather promoted but also the stacking factor of the steel sheet decreases. The thickness of the oxide layer is therefore less than 80 nm. The thickness of the oxide layer can be measured by scanning transmission electron microscope-energy dispersive X-ray spectroscopy (STEM-EDS). More specifically, the thickness of the oxide layer can be measured by the method described in the EXAMPLES section.

The concentration of Si contained in the oxide layer is not limited, and may be any concentration. If the Si concentration in the oxide layer is 12 at % (atomic %) or more, iron loss after stress relief annealing can be reduced. This is because, when the oxide layer contains 12 at % or more of Si, Al is preferentially oxidized during stress relief annealing to form a dense film and exhibits an excellent nitridation inhibiting effect. Hence, the Si concentration in the oxide layer is preferably 12 at % or more. Although no upper limit is placed on the Si concentration in the oxide layer, the Si concentration in the oxide layer is preferably 40 at % or less. The Si concentration in the oxide layer can be measured by STEM-EDS. More specifically, the Si concentration in the oxide layer can be measured by the method described in the EXAMPLES section.

The oxide layer may be amorphous, crystalline, or a composite oxide of amorphous and crystalline. The ratio of the crystalline phase to the total of the amorphous phase and the crystalline phase contained in the oxide layer is preferably in the range of 0% or more and 30% or less and more preferably in the range of 0% or more and 10% or less.

[Production Method]

Next, a method of producing a non-oriented electrical steel sheet in one embodiment of the present disclosure will be described.

In one embodiment of the present disclosure, a non-oriented electrical steel sheet can be produced by subjecting a steel material (slab) having the above-described chemical composition to the following treatments (1) to (3) sequentially:

(1) cold rolling
(2) acidizing
(3) final annealing.

In another embodiment of the present disclosure, hot rolling and hot-rolled sheet annealing may be performed before the cold rolling. In other words, in the other embodiment, a non-oriented electrical steel sheet can be produced by subjecting a steel material (slab) having the above-described chemical composition to the following treatments (1) to (5) sequentially:

(1) hot rolling
(2) hot-rolled sheet annealing
(3) cold rolling
(4) acidizing
(5) final annealing.

[Steel Material]

As the steel material, any steel material having the above-described chemical composition may be used. A typical example of the steel material is a steel slab.

The method of producing the steel material is not limited, and the steel material may be produced by any method. For example, steel is prepared by steelmaking in a refining process using a converter, an electric furnace, a vacuum degasser, etc., and then made into a steel material by a continuous casting method or an ingot casting and blooming method. A thin slab or thinner cast steel of 100 mm or less in thickness produced by a direct casting method may be used as the steel material.

[Hot Rolling]

In the case of performing hot rolling, the steel material is hot rolled to obtain a hot-rolled steel sheet. The hot rolling conditions are not limited, and hot rolling may be performed under commonly known conditions.

Typically, the steel material is reheated in a heating furnace or the like and then rolled. Alternatively, the cast steel material may be immediately hot rolled without reheating.

In the case of not performing hot rolling, the steel material can be directly subjected to cold rolling. In the case where hot rolling is omitted, it is preferable to use a thin slab or thinner cast steel as the steel material.

[Hot-Rolled Sheet Annealing]

In the case where hot rolling is performed, the obtained hot-rolled steel sheet is subjected to hot-rolled sheet annealing to obtain a hot-rolled and annealed sheet. The hot-rolled sheet annealing conditions are not limited. If the soaking temperature is less than 800° C., however, the effect of hot-rolled sheet annealing is small and the magnetic property improving effect may be insufficient. Accordingly, the soaking temperature in the hot-rolled sheet annealing is preferably 800° C. or more and more preferably 850° C. or more. If the soaking temperature is more than 1100° C., the production costs increase. In addition, due to coarsening of crystal grains, embrittlement fracture (breakage) tends to occur during subsequent cold rolling. The soaking temperature is therefore preferably 1100° C. or less and more preferably 1000° C. or less.

The soaking time in the hot-rolled sheet annealing is preferably 3 minutes or less and more preferably 1 minute or less, from the viewpoint of ensuring productivity. Although no lower limit is placed on the soaking time, the soaking time is preferably 1 second or more and more preferably 5 seconds or more.

[Cold Rolling]

Next, cold rolling is performed. In the case where hot rolling and hot-rolled sheet annealing are performed, the hot-rolled and annealed sheet is subjected to cold rolling to obtain a cold-rolled steel sheet having a final sheet thickness. In the case where hot rolling and hot-rolled sheet annealing are not performed, the steel material is directly subjected to cold rolling to obtain a cold-rolled steel sheet having a final sheet thickness. Cold rolling may be performed only once, or twice or more. In the case of performing cold rolling twice or more, intermediate annealing is performed between cold rolling. The cold rolling conditions are not limited, and cold rolling may be performed under commonly known conditions.

The final sheet thickness in the cold rolling, that is, the sheet thickness of the non-oriented electrical steel sheet finally obtained, is not limited and may be any thickness. If the non-oriented electrical steel sheet is excessively thick, however, iron loss increases. The final sheet thickness is therefore preferably 0.35 mm or less. Although no lower limit is placed on the sheet thickness, the sheet thickness is preferably 0.1 mm or more.

[Acidizing]

After the cold rolling, acidizing is performed on the surface of the steel sheet before subsequent final annealing. As a result of an oxide layer being formed by the acidizing, nitridation during the subsequent final annealing can be inhibited. For the acidizing, it is necessary to use an acid containing at least one of hydrochloric acid, phosphoric acid, sulfuric acid, and nitric acid at a total concentration of 3% or more. In particular, in order to set the Si concentration in the oxide layer to 12 at % or more, the total concentration of the acid is preferably 5% or more. If the concentration of the acid is excessively high, it is difficult to dispose of the acid after use. Accordingly, the total concentration of the acid is 30% or less and preferably 25% or less, from the viewpoint of ease of liquid waste disposal.

The acidizing time is 1 second to 60 seconds. In particular, in order to set the Si concentration in the oxide layer to 12 at % or more, the acidizing time is preferably 2 seconds or more. From the viewpoint of productivity, the acidizing time is preferably 20 seconds or less.

The acidizing method is not limited, and any method may be used. For example, the steel sheet may be immersed in the acid, or the acid may be sprayed onto the surface of the steel sheet.

[Final Annealing]

The acidized steel sheet is then subjected to final annealing. The final annealing conditions are not limited, and final annealing may be performed under commonly known conditions. From the viewpoint of coarsening the crystal grain size and further reducing iron loss, the soaking temperature in the final annealing is preferably 900° C. to 1200° C. and more preferably 1000° C. to 1100° C. For the same reason, the soaking time in the final annealing is preferably 1 second to 120 seconds and more preferably 5 seconds to 60 seconds.

The non-oriented electrical steel sheet can be produced by the method described above. After the final annealing, an insulating coating may be optionally formed on the surface of the non-oriented electrical steel sheet. The insulating coating may be formed under commonly known conditions.

EXAMPLES

In order to determine the effects according to the present disclosure, non-oriented electrical steel sheets were produced according to the following procedure and their magnetic properties were evaluated.

Steel slabs having the chemical compositions shown in Tables 1 to 3 were heated at 1120° C. for 30 minutes, and then hot rolled to obtain hot-rolled steel sheets of 1.9 mm in sheet thickness. The hot-rolled steel sheets were then subjected to hot-rolled sheet annealing at 950° C. for 30 seconds to obtain hot-rolled and annealed sheets. The hot-rolled and annealed sheets were pickled, and then cold rolled to obtain cold-rolled steel sheets having the final sheet thicknesses shown in Tables 4 to 6.

The cold-rolled steel sheets were subjected to acidizing under the conditions shown in Tables 4 to 6, and then subjected to final annealing to obtain non-oriented electrical steel sheets. The final annealing was performed at 1000° C. for 15 seconds in an atmosphere of $H_2$:$N_2$=20:80 in vol %.

In Comparative Example No. 14 with an excessively high Mn content, slab cracking occurred during hot rolling and consequently production was discontinued. Likewise, in Comparative Example No. 15 with an excessively high Al content and Comparative Example No. 18 with an excessively high Si content, slab cracking occurred during hot rolling and consequently production was discontinued. In Comparative Example No. 21 with an excessively high P content, cracking occurred during cold rolling and consequently production was discontinued.

(Surface Layer Nitridation Amount)

Next, test pieces were collected from each of the obtained non-oriented electrical steel sheets, and electrolytic extraction analysis was conducted to measure the amount of N existing as AlN in the range from one surface of the non-oriented electrical steel sheet to a depth of 1/20 of the sheet thickness (surface layer nitridation amount).

(Thickness of Oxide Layer)

An oxide layer containing one or both of Al and Si was formed at the surface of the obtained non-oriented electrical steel sheet. The thickness of the oxide layer was measured by scanning transmission electron microscope-energy dispersive X-ray spectroscopy (STEM-EDS). Specifically, EDS map measurement was performed at intervals of 0.5 nm to obtain an elemental analysis map. In the elemental analysis map, a layer region with a O concentration of 15 at % or more at the surface of the steel sheet was taken to be an oxide layer and its thickness was determined.

(Si Concentration in Oxide Layer)

The Si concentration in the oxide layer was measured by STEM-EDS. Specifically, the average value of the Si concentration in the oxide layer was determined from the elemental analysis map obtained by the foregoing STEM-EDS measurement.

Moreover, a sample was collected from each of the obtained non-oriented electrical steel sheets, test pieces of 30 mm in width and 180 mm in length were cut out from the rolling direction (L direction) and the transverse direction (C direction), and the iron loss $W_{10/400}$ in the (L+C) direction was measured by Epstein testing. In this example, the high-frequency iron loss was determined as good in the case where the measured iron loss $W_{10/400}$ was less than the iron loss reference value (W/kg) given by the following formula (1):

$$\text{iron loss reference value (W/kg)} = 2.18 \times t + 7.5 \tag{1}$$

where t is the sheet thickness (mm) of the non-oriented electrical steel sheet.

The measurement results are shown in Tables 4 to 6. As can be seen from these results, each non-oriented electrical steel sheet satisfying the conditions according to the present disclosure exhibited excellent reduction in iron loss in the high frequency range. According to the present disclosure, it is possible to reduce iron loss in the high frequency range without addition of a large amount of alloying elements, which causes a decrease in magnetic flux density. The non-oriented electrical steel sheet according to the present disclosure is thus suitable for use as a material for motor cores of hybrid electric vehicles, electric vehicles, high-speed generators, air conditioner compressors, vacuum cleaners, machine tools, etc.

TABLE 1

| | Chemical composition (mass %)* | | | | | | | | | | | |
|---|---|---|---|---|---|---|---|---|---|---|---|---|
| No. | C | Si | Mn | P | S | Al | Co | Ti | Nb | O | N | Others |
| 1 | 0.0025 | 3.5 | 0.4 | 0.01 | 0.0019 | 0.8 | 0.0021 | 0.0011 | 0.0009 | 0.0024 | 0.0027 | Sn: 0.03 |
| 2 | 0.0025 | 3.5 | 0.4 | 0.01 | 0.0019 | 0.8 | 0.0021 | 0.0011 | 0.0009 | 0.0024 | 0.0027 | Sn: 0.03 |
| 3 | 0.0025 | 3.5 | 0.4 | 0.01 | 0.0019 | 0.8 | 0.0021 | 0.0011 | 0.0009 | 0.0024 | 0.0027 | Sn: 0.03 |
| 4 | 0.0025 | 3.5 | 0.4 | 0.01 | 0.0019 | 0.8 | 0.0021 | 0.0011 | 0.0009 | 0.0024 | 0.0027 | Sn: 0.03 |
| 5 | 0.0025 | 3.5 | 0.4 | 0.01 | 0.0019 | 0.8 | 0.0002 | 0.0011 | 0.0009 | 0.0024 | 0.0027 | Sn: 0.03 |
| 6 | 0.0025 | 1.9 | 0.5 | 0.01 | 0.0019 | 0.6 | 0.0029 | 0.0013 | 0.0011 | 0.0025 | 0.0024 | — |
| 7 | 0.0025 | 3.8 | 0.5 | 0.01 | 0.0019 | 0.6 | 0.0029 | 0.0013 | 0.0011 | 0.0025 | 0.0024 | — |
| 8 | 0.0025 | 3.8 | 0.5 | 0.01 | 0.0019 | 0.6 | 0.0029 | 0.0013 | 0.0011 | 0.0025 | 0.0024 | — |
| 9 | 0.0025 | 3.8 | 0.5 | 0.01 | 0.0019 | 0.6 | 0.0029 | 0.0013 | 0.0011 | 0.0025 | 0.0024 | — |
| 10 | 0.0025 | 3.8 | 0.5 | 0.01 | 0.0019 | 0.6 | 0.0029 | 0.0013 | 0.0011 | 0.0025 | 0.0024 | — |
| 11 | 0.0025 | 3.8 | 0.5 | 0.01 | 0.0019 | 0.6 | 0.0029 | 0.0013 | 0.0011 | 0.0025 | 0.0024 | — |
| 12 | 0.0028 | 3.2 | 0.8 | 0.01 | 0.0024 | 1.2 | 0.0024 | 0.0008 | 0.0012 | 0.0021 | 0.0019 | Sn: 0.03 |
| 13 | 0.0028 | 3.2 | 0.8 | 0.01 | 0.0024 | 1.8 | 0.0024 | 0.0008 | 0.0012 | 0.0021 | 0.0020 | Sn: 0.03 |
| 14 | 0.0029 | 3.5 | 2.5 | 0.01 | 0.0024 | 0.5 | 0.0021 | 0.0008 | 0.0011 | 0.0021 | 0.0028 | — |
| 15 | 0.0025 | 3.3 | 0.1 | 0.01 | 0.0024 | 3.5 | 0.0015 | 0.0008 | 0.0011 | 0.0021 | 0.0021 | — |
| 16 | 0.0019 | 4.2 | 0.3 | 0.01 | 0.0015 | 0.3 | 0.0026 | 0.0014 | 0.0012 | 0.0019 | 0.0027 | Sb: 0.01 |
| 17 | 0.0019 | 5.6 | 0.3 | 0.01 | 0.0015 | 0.3 | 0.0027 | 0.0014 | 0.0012 | 0.0019 | 0.0027 | — |
| 18 | 0.0022 | 7.2 | 0.2 | 0.01 | 0.0024 | 0.3 | 0.0038 | 0.0008 | 0.0011 | 0.0021 | 0.0028 | — |
| 19 | 0.0021 | 4.0 | 0.4 | 0.01 | 0.0026 | 0.6 | 0.0032 | 0.0011 | 0.0013 | 0.0028 | 0.0024 | Sn: 0.03 |
| 20 | 0.0021 | 4.0 | 0.4 | 0.01 | 0.0026 | 0.6 | 0.0032 | 0.0011 | 0.0013 | 0.0028 | 0.0024 | Sn: 0.03 |
| 21 | 0.0026 | 3.2 | 0.1 | 0.25 | 0.0026 | 1.5 | 0.0025 | 0.0011 | 0.0013 | 0.0028 | 0.0024 | Sn: 0.06 |
| 22 | 0.0024 | 3.4 | 1.2 | 0.01 | 0.0019 | 0.9 | 0.0024 | 0.0016 | 0.0014 | 0.0027 | 0.0021 | Sn: 0.03 |
| 23 | 0.0024 | 3.3 | 1.8 | 0.01 | 0.0019 | 0.7 | 0.0024 | 0.0016 | 0.0014 | 0.0027 | 0.0021 | Sn: 0.03 |

*Balance consisting of Fe and inevitable impurities

TABLE 2

| | Chemical composition (mass %)* | | | | | | | | | | | |
|---|---|---|---|---|---|---|---|---|---|---|---|---|
| No. | C | Si | Mn | P | S | Al | Co | Ti | Nb | O | N | Others |
| 24 | 0.0018 | 3.5 | 0.2 | 0.01 | 0.0015 | 0.9 | 0.0021 | 0.0012 | 0.0009 | 0.0027 | 0.0021 | Sb: 0.05 |
| 25 | 0.0017 | 3.6 | 0.5 | 0.01 | 0.0024 | 0.8 | 0.0027 | 0.0016 | 0.0014 | 0.0027 | 0.0021 | Ca: 0.0034 |
| 26 | 0.0017 | 3.6 | 0.5 | 0.01 | 0.0026 | 0.8 | 0.0027 | 0.0016 | 0.0014 | 0.0027 | 0.0021 | Mg: 0.0025 |
| 27 | 0.0017 | 3.6 | 0.5 | 0.01 | 0.0027 | 0.8 | 0.0027 | 0.0016 | 0.0014 | 0.0027 | 0.0021 | REM: 0.0072 |
| 28 | 0.0025 | 3.3 | 0.6 | 0.01 | 0.0059 | 0.9 | 0.0019 | 0.0018 | 0.0013 | 0.0029 | 0.0026 | Sn: 0.04 |
| 29 | 0.0025 | 3.8 | 0.2 | 0.01 | 0.0015 | 0.5 | 0.0021 | 0.0041 | 0.0013 | 0.0029 | 0.0026 | Sn: 0.04 |
| 30 | 0.0025 | 3.8 | 0.2 | 0.01 | 0.0015 | 0.5 | 0.0021 | 0.0007 | 0.0038 | 0.0029 | 0.0026 | Sn: 0.04 |
| 31 | 0.0025 | 3.8 | 0.2 | 0.01 | 0.0015 | 0.5 | 0.0021 | 0.0007 | 0.0011 | 0.0064 | 0.0026 | Sn: 0.04 |
| 32 | 0.0025 | 3.8 | 0.2 | 0.01 | 0.0015 | 0.5 | 0.0021 | 0.0007 | 0.0011 | 0.0021 | 0.0065 | Sn: 0.04 |
| 33 | 0.0021 | 4.1 | 0.5 | 0.01 | 0.0023 | 0.7 | 0.0024 | 0.0012 | 0.0013 | 0.0023 | 0.0022 | Sn: 0.03 |
| 34 | 0.0021 | 4.1 | 0.5 | 0.01 | 0.0023 | 0.7 | 0.0024 | 0.0012 | 0.0013 | 0.0023 | 0.0022 | Sn: 0.03 |

TABLE 2-continued

| No. | Chemical composition (mass %)* C | Si | Mn | P | S | Al | Co | Ti | Nb | O | N | Others |
|---|---|---|---|---|---|---|---|---|---|---|---|---|
| 35 | 0.0021 | 4.1 | 0.5 | 0.01 | 0.0023 | 0.7 | 0.0024 | 0.0012 | 0.0013 | 0.0023 | 0.0022 | Sn: 0.03 |
| 36 | 0.0026 | 3.4 | 0.9 | 0.01 | 0.0026 | 1.4 | 0.0019 | 0.0018 | 0.0012 | 0.0021 | 0.0023 | Sn: 0.03 |
| 37 | 0.0026 | 3.4 | 0.9 | 0.01 | 0.0026 | 1.4 | 0.0019 | 0.0018 | 0.0012 | 0.0021 | 0.0023 | Sn: 0.03 |
| 38 | 0.0026 | 3.4 | 0.9 | 0.01 | 0.0026 | 1.4 | 0.0019 | 0.0018 | 0.0012 | 0.0021 | 0.0023 | Sn: 0.03 |
| 39 | 0.0025 | 3.7 | 0.8 | 0.01 | 0.0021 | 0.8 | 0.0021 | 0.0013 | 0.0013 | 0.0032 | 0.0031 | Sn: 0.03, Ca: 0.0029 |
| 40 | 0.0025 | 3.5 | 0.4 | 0.01 | 0.0019 | 0.8 | 0.0021 | 0.0011 | 0.0009 | 0.0024 | 0.0027 | Sn: 0.03 |
| 41 | 0.0025 | 3.5 | 0.4 | 0.01 | 0.0019 | 0.8 | 0.0021 | 0.0011 | 0.0009 | 0.0024 | 0.0027 | Sn: 0.03 |
| 42 | 0.0025 | 3.5 | 0.4 | 0.01 | 0.0019 | 0.8 | 0.0021 | 0.0011 | 0.0009 | 0.0024 | 0.0027 | Sn: 0.03 |
| 43 | 0.0025 | 3.5 | 0.4 | 0.01 | 0.0019 | 0.8 | 0.0021 | 0.0011 | 0.0009 | 0.0024 | 0.0027 | Sn: 0.03 |
| 44 | 0.0025 | 3.5 | 0.4 | 0.01 | 0.0019 | 0.8 | 0.0021 | 0.0011 | 0.0009 | 0.0024 | 0.0027 | Sn: 0.03 |
| 45 | 0.0025 | 3.5 | 0.4 | 0.01 | 0.0019 | 0.8 | 0.0021 | 0.0011 | 0.0009 | 0.0024 | 0.0027 | Sn: 0.03 |

*Balance consisting of Fe and inevitable impurities

TABLE 3

| No. | Chemical composition (mass %)* C | Si | Mr | P | S | Al | Co | Ti | Nb | O | N | Others |
|---|---|---|---|---|---|---|---|---|---|---|---|---|
| 46 | 0.0025 | 3.5 | 0.4 | 0.01 | 0.0019 | 0.8 | 0.0021 | 0.0011 | 0.0009 | 0.0024 | 0.0027 | Sn: 0.03, Cu: 0.30 |
| 47 | 0.0025 | 3.5 | 0.4 | 0.01 | 0.0019 | 0.8 | 0.0021 | 0.0011 | 0.0009 | 0.0024 | 0.0027 | Sn: 0.03, Cu: 0.50 |
| 48 | 0.0025 | 3.5 | 0.4 | 0.01 | 0.0019 | 0.8 | 0.0021 | 0.0011 | 0.0009 | 0.0024 | 0.0027 | Sn: 0.03, Cr: 0.10 |
| 49 | 0.0025 | 3.5 | 0.4 | 0.01 | 0.0019 | 0.8 | 0.0021 | 0.0011 | 0.0009 | 0.0024 | 0.0027 | Sn: 0.03, Cr: 0.30 |
| 50 | 0.0025 | 3.5 | 0.4 | 0.01 | 0.0019 | 0.8 | 0.0021 | 0.0011 | 0.0009 | 0.0024 | 0.0027 | Sn: 0.03, Cr: 0.90 |
| 51 | 0.0025 | 3.5 | 0.4 | 0.01 | 0.0019 | 0.8 | 0.0021 | 0.0011 | 0.0009 | 0.0024 | 0.0027 | Sn: 0.03, Ni: 0.04 |
| 52 | 0.0025 | 3.5 | 0.4 | 0.01 | 0.0019 | 0.8 | 0.0021 | 0.0011 | 0.0009 | 0.0024 | 0.0027 | Sn: 0.03, Ni: 0.50 |
| 53 | 0.0025 | 3.5 | 0.4 | 0.01 | 0.0019 | 0.8 | 0.0021 | 0.0011 | 0.0009 | 0.0024 | 0.0027 | Sn: 0.03, Ni: 0.80 |
| 54 | 0.0025 | 3.5 | 0.4 | 0.01 | 0.0019 | 0.8 | 0.0021 | 0.0011 | 0.0009 | 0.0024 | 0.0027 | Sn: 0.03, Cu: 0.30, Cr: 0.10, Ni: 0.10 |
| 55 | 0.0028 | 3.2 | 0.8 | 0.01 | 0.0024 | 1.2 | 0.0024 | 0.0008 | 0.0012 | 0.0021 | 0.0019 | Sn: 0.03, Zn: 0.0015 |
| 56 | 0.0028 | 3.2 | 0.8 | 0.01 | 0.0024 | 1.2 | 0.0024 | 0.0008 | 0.0012 | 0.0021 | 0.0019 | Sn: 0.03, Zn: 0.0045 |
| 57 | 0.0028 | 3.2 | 0.8 | 0.01 | 0.0024 | 1.2 | 0.0024 | 0.0008 | 0.0012 | 0.0021 | 0.0019 | Sn: 0.03, Zn: 0.021 |
| 58 | 0.0028 | 3.2 | 0.8 | 0.01 | 0.0024 | 1.2 | 0.0024 | 0.0008 | 0.0012 | 0.0021 | 0.0019 | Sn: 0.03, Mo: 0.0029 |
| 59 | 0.0028 | 3.2 | 0.8 | 0.01 | 0.0024 | 1.2 | 0.0024 | 0.0008 | 0.0012 | 0.0021 | 0.0019 | Sn: 0.03, Mo: 0.0300 |
| 60 | 0.0028 | 3.2 | 0.8 | 0.01 | 0.0024 | 1.2 | 0.0024 | 0.0008 | 0.0012 | 0.0021 | 0.0019 | Sn: 0.03, Zn: 0.0068, Mo: 0.0050 |
| 61 | 0.0028 | 3.2 | 0.8 | 0.01 | 0.0024 | 1.2 | 0.0024 | 0.0008 | 0.0012 | 0.0021 | 0.0019 | Sn: 0.03, W: 0.0011 |
| 62 | 0.0028 | 3.2 | 0.8 | 0.01 | 0.0024 | 1.2 | 0.0024 | 0.0008 | 0.0012 | 0.0021 | 0.0019 | Sn: 0.03, W: 0.014 |
| 63 | 0.0028 | 3.2 | 0.8 | 0.01 | 0.0024 | 1.2 | 0.0024 | 0.0008 | 0.0012 | 0.0021 | 0.0019 | Sn: 0.03, W: 0.036 |
| 64 | 0.0024 | 3.4 | 1.2 | 0.01 | 0.0019 | 0.9 | 0.0024 | 0.0016 | 0.0014 | 0.0027 | 0.0021 | Sn: 0.03, Ga: 0.0012 |
| 65 | 0.0024 | 3.4 | 1.2 | 0.01 | 0.0019 | 0.9 | 0.0024 | 0.0016 | 0.0014 | 0.0027 | 0.0021 | Sn: 0.03, Ge: 0.0024 |
| 66 | 0.0024 | 3.4 | 1.2 | 0.01 | 0.0019 | 0.9 | 0.0024 | 0.0016 | 0.0014 | 0.0027 | 0.0021 | Sn: 0.03, Ga: 0.0034, Ge: 0.0042 |
| 67 | 0.0024 | 3.4 | 1.2 | 0.01 | 0.0019 | 0.9 | 0.0024 | 0.0016 | 0.0014 | 0.0027 | 0.0021 | Sn: 0.03, Ga: 0.0067 |
| 68 | 0.0024 | 3.4 | 1.2 | 0.01 | 0.0019 | 0.9 | 0.0024 | 0.0016 | 0.0014 | 0.0027 | 0.0021 | Sn: 0.03, Ge: 0.081 |
| 69 | 0.0024 | 3.4 | 1.2 | 0.01 | 0.0019 | 0.9 | 0.0024 | 0.0016 | 0.0014 | 0.0027 | 0.0021 | Sn: 0.03, Ga: 0.0008, Ge: 0.0007 |

*Balance consisting of Fe and inevitable impurities

TABLE 4

| | | Acidizing | | | Measurement results | | | | | |
|---|---|---|---|---|---|---|---|---|---|---|
| | Final | | | | Surface layer | Oxide layer | | Iron loss | | |
| No. | sheet thickness (mm) | Acid | Acid concentration (wt %) | Acidizing time (sec) | nitridation amount (mass %) | Thickness (nm) | Si concentration (at %) | reference value (W/kg) | $W_{10/400}$ (W/kg) | Remarks |
| 1 | 0.25 | Phosphoric acid | 10 | 5 | 0.0019 | 30 | 32 | 13.0 | 11.4 | Example |
| 2 | 0.25 | Hydrochloric acid | 10 | 5 | 0.0018 | 40 | 32 | 13.0 | 11.3 | Example |
| 3 | 0.25 | Sulfuric acid | 10 | 5 | 0.0015 | 35 | 32 | 13.0 | 11.2 | Example |
| 4 | 0.25 | Nitric acid | 10 | 5 | 0.0014 | 25 | 32 | 13.0 | 11.1 | Example |
| 5 | 0.25 | Phosphoric acid | 10 | 5 | 0.0054 | 30 | 12 | 13.0 | 13.9 | Comparative Example |
| 6 | 0.25 | Phosphoric acid | 10 | 5 | 0.0019 | 40 | 12 | 13.0 | 14.3 | Comparative Example |
| 7 | 0.30 | Nitric acid + hydrochloric acid | 20 | 3 | 0.0015 | 20 | 35 | 14.0 | 11.0 | Example |

TABLE 4-continued

| No. | Final sheet thickness (mm) | Acidizing: Acid | Acidizing: Acid concentration (wt %) | Acidizing: Acidizing time (sec) | Measurement results: Surface layer nitridation amount (mass %) | Measurement results: Oxide layer Thickness (nm) | Measurement results: Oxide layer Si concentration (at %) | Measurement results: Iron loss reference value (W/kg) | $W_{10/400}$ (W/kg) | Remarks |
|---|---|---|---|---|---|---|---|---|---|---|
| 8 | 0.30 | Hydrochloric acid + phosphoric acid | 15 | 15 | 0.0021 | 70 | 33 | 14.0 | 11.3 | Example |
| 9 | 0.30 | Hydrochloric acid | 2 | 10 | 0.0058 | 5 | 3 | 14.0 | 15.0 | Comparative Example |
| 10 | 0.30 | Hydrochloric acid | 8 | 80 | 0.0049 | 115 | 7 | 14.0 | 14.2 | Comparative Example |
| 11 | 0.30 | Nitric acid + hydrochloric acid + phosphoric acid | 15 | 5 | 0.0015 | 25 | 33 | 14.0 | 12.2 | Example |
| 12 | 0.27 | Sulfuric acid + hydrochloric acid + phosphoric acid | 25 | 25 | 0.0018 | 75 | 34 | 13.4 | 11.8 | Example |
| 13 | 0.25 | Nitric acid | 20 | 5 | 0.0016 | 40 | 33 | 13.0 | 11.3 | Example |
| 14 | — | — | — | — | — | — | — | — | — | Comparative Example |
| 15 | — | — | — | — | — | — | — | — | — | Comparative Example |
| 16 | 0.25 | Phosphoric acid | 25 | 5 | 0.0019 | 55 | 38 | 13.0 | 10.9 | Example |
| 17 | 0.25 | Phosphoric acid | 25 | 5 | 0.0018 | 50 | 38 | 13.0 | 10.0 | Example |
| 18 | — | — | — | — | — | — | — | — | — | Comparative Example |
| 19 | 0.35 | Nitric acid | 15 | 10 | 0.0008 | 60 | 23 | 15.1 | 12.6 | Example |
| 20 | 0.20 | Nitric acid | 15 | 20 | 0.0015 | 70 | 23 | 11.9 | 9.1 | Example |
| 21 | — | — | — | — | — | — | — | — | — | Comparative Example |
| 22 | 0.25 | Hydrochloric acid | 5 | 30 | 0.0021 | 50 | 5 | 13.0 | 11.4 | Example |
| 23 | 0.25 | Hydrochloric acid | 5 | 30 | 0.0020 | 50 | 5 | 13.0 | 11.2 | Example |

TABLE 5

| No. | Final sheet thickness (mm) | Acidizing: Acid | Acidizing: Acid concentration (wt %) | Acidizing: Acidizing time (sec) | Measurement results: Surface layer nitridation amount (mass %) | Measurement results: Oxide layer Thickness (nm) | Measurement results: Oxide layer Si concentration (at %) | Measurement results: Iron loss reference value (W/kg) | $W_{10/400}$ (W/kg) | Remarks |
|---|---|---|---|---|---|---|---|---|---|---|
| 24 | 0.27 | Phosphoric acid | 3 | 50 | 0.0025 | 70 | 3 | 13.4 | 11.7 | Example |
| 25 | 0.25 | Nitric acid + hydrochloric acid | 8 | 20 | 0.0021 | 50 | 7 | 13.0 | 11.1 | Example |
| 26 | 0.25 | Sulfuric acid | 10 | 15 | 0.0015 | 45 | 22 | 13.0 | 11.0 | Example |
| 27 | 0.25 | Sulfuric acid | 10 | 15 | 0.0015 | 45 | 22 | 13.0 | 11.0 | Example |
| 28 | 0.25 | Hydrochloric acid + phosphoric acid | 20 | 5 | 0.0024 | 30 | 15 | 13.0 | 14.4 | Comparative Example |
| 29 | 0.25 | Hydrochloric acid + phosphoric acid | 20 | 5 | 0.0021 | 30 | 15 | 13.0 | 15.2 | Comparative Example |
| 30 | 0.25 | Hydrochloric acid + phosphoric acid | 20 | 5 | 0.0022 | 30 | 15 | 13.0 | 15.1 | Comparative Example |
| 31 | 0.25 | Hydrochloric acid + phosphoric acid | 20 | 5 | 0.0021 | 30 | 15 | 13.0 | 14.8 | Comparative Example |
| 32 | 0.25 | Hydrochloric acid + phosphoric acid | 20 | 5 | 0.0054 | 30 | 15 | 13.0 | 16.5 | Comparative Example |
| 33 | 0.20 | Hydrochloric acid + nitric acid | 15 | 4 | 0.0019 | 35 | 33 | 11.9 | 9.3 | Example |
| 34 | 0.25 | Hydrochloric acid + nitric acid | 15 | 4 | 0.0018 | 35 | 33 | 13.0 | 10.5 | Example |
| 35 | 0.30 | Hydrochloric acid + nitric acid | 15 | 4 | 0.0018 | 35 | 33 | 14.0 | 11.9 | Example |
| 36 | 0.15 | Sulfuric acid + phosphoric acid | 25 | 2 | 0.0013 | 40 | 34 | 10.8 | 8.8 | Example |
| 37 | 0.20 | Sulfuric acid + phosphoric acid | 25 | 2 | 0.0012 | 40 | 34 | 11.9 | 9.5 | Example |
| 38 | 0.25 | Sulfuric acid + phosphoric acid | 25 | 2 | 0.0012 | 40 | 34 | 13.0 | 10.7 | Example |
| 39 | 0.25 | Sulfuric acid + phosphoric acid | 25 | 2 | 0.0012 | 40 | 34 | 13.0 | 10.9 | Example |
| 40 | 0.25 | Nitric acid | 3 | 1 | 0.0023 | 15 | 2 | 13.0 | 12.2 | Example |
| 41 | 0.25 | Nitric acid | 3 | 60 | 0.0022 | 35 | 3 | 13.0 | 12.1 | Example |

TABLE 5-continued

| No. | Final sheet thickness (mm) | Acidizing: Acid | Acidizing: Acid concentration (wt %) | Acidizing: Acidizing time (sec) | Measurement results: Surface layer nitridation amount (mass %) | Measurement results: Oxide layer Thickness (nm) | Measurement results: Oxide layer Si concentration (at %) | Iron loss reference value (W/kg) | $W_{10/400}$ (W/kg) | Remarks |
|---|---|---|---|---|---|---|---|---|---|---|
| 42 | 0.25 | Nitric acid | 30 | 1 | 0.0021 | 40 | 24 | 13.0 | 12.0 | Example |
| 43 | 0.25 | Nitric acid | 30 | 60 | 0.0021 | 75 | 30 | 13.0 | 12.0 | Example |
| 44 | 0.25 | Hydrochloric acid | 20 | 70 | 0.0048 | 85 | 14 | 13.0 | 14.5 | Comparative Example |
| 45 | 0.25 | Hydrochloric acid | 20 | 90 | 0.0049 | 95 | 13 | 13.0 | 14.7 | Comparative Example |

TABLE 6

| No. | Final sheet thickness (mm) | Acidizing: Acid | Acidizing: Acid concentration (wt %) | Acidizing: Acidizing time (sec) | Measurement results: Surface layer nitridation amount (mass %) | Measurement results: Oxide layer Thickness (nm) | Measurement results: Oxide layer Si concentration (at %) | Iron loss reference value (W/kg) | $W_{10/400}$ (W/kg) | Remarks |
|---|---|---|---|---|---|---|---|---|---|---|
| 46 | 0.25 | Sulfuric acid | 10 | 5 | 0.0015 | 35 | 22 | 13.0 | 11.1 | Example |
| 47 | 0.25 | Sulfuric acid | 10 | 5 | 0.0015 | 35 | 22 | 13.0 | 11.0 | Example |
| 48 | 0.25 | Sulfuric acid | 10 | 5 | 0.0015 | 35 | 22 | 13.0 | 11.1 | Example |
| 49 | 0.25 | Sulfuric acid | 10 | 5 | 0.0015 | 35 | 22 | 13.0 | 11.1 | Example |
| 50 | 0.25 | Sulfuric acid | 10 | 5 | 0.0015 | 35 | 22 | 13.0 | 11.0 | Example |
| 51 | 0.25 | Sulfuric acid | 10 | 5 | 0.0015 | 35 | 22 | 13.0 | 11.1 | Example |
| 52 | 0.25 | Sulfuric acid | 10 | 5 | 0.0015 | 35 | 22 | 13.0 | 11.0 | Example |
| 53 | 0.25 | Sulfuric acid | 10 | 5 | 0.0015 | 35 | 22 | 13.0 | 11.0 | Example |
| 54 | 0.25 | Sulfuric acid | 10 | 5 | 0.0015 | 35 | 22 | 13.0 | 11.0 | Example |
| 55 | 0.27 | Sulfuric acid + hydrochloric acid + phosphoric acid | 25 | 25 | 0.0017 | 75 | 34 | 13.4 | 11.7 | Example |
| 56 | 0.27 | Sulfuric acid + hydrochloric acid + phosphoric acid | 25 | 25 | 0.0016 | 75 | 34 | 13.4 | 11.6 | Example |
| 57 | 0.27 | Sulfuric acid + hydrochloric acid + phosphoric acid | 25 | 25 | 0.0015 | 75 | 34 | 13.4 | 11.5 | Example |
| 58 | 0.27 | Sulfuric acid + hydrochloric acid + phosphoric acid | 25 | 25 | 0.0017 | 75 | 34 | 13.4 | 11.7 | Example |
| 59 | 0.27 | Sulfuric acid + hydrochloric acid + phosphoric acid | 25 | 25 | 0.0017 | 75 | 34 | 13.4 | 11.7 | Example |
| 60 | 0.27 | Sulfuric acid + hydrochloric acid + phosphoric acid | 25 | 25 | 0.0016 | 75 | 34 | 13.4 | 11.7 | Example |
| 61 | 0.27 | Sulfuric acid + hydrochloric acid + phosphoric acid | 25 | 25 | 0.0017 | 75 | 34 | 13.4 | 11.7 | Example |
| 62 | 0.27 | Sulfuric acid + hydrochloric acid + phosphoric acid | 25 | 25 | 0.0017 | 75 | 34 | 13.4 | 11.7 | Example |
| 63 | 0.27 | Sulfuric acid + hydrochloric acid + phosphoric acid | 25 | 25 | 0.0017 | 75 | 34 | 13.4 | 11.6 | Example |
| 64 | 0.25 | Hydrochloric acid | 5 | 30 | 0.0021 | 50 | 16 | 13.0 | 11.3 | Example |
| 65 | 0.25 | Hydrochloric acid | 5 | 30 | 0.0021 | 50 | 16 | 13.0 | 11.2 | Example |
| 66 | 0.25 | Hydrochloric acid | 5 | 30 | 0.0021 | 50 | 16 | 13.0 | 11.2 | Example |
| 67 | 0.25 | Hydrochloric acid | 5 | 30 | 0.0021 | 50 | 16 | 13.0 | 11.2 | Example |
| 68 | 0.25 | Hydrochloric acid | 5 | 30 | 0.0021 | 50 | 16 | 13.0 | 11.2 | Example |
| 69 | 0.25 | Hydrochloric acid | 5 | 30 | 0.0021 | 50 | 16 | 13.0 | 11.3 | Example |

The invention claimed is:

1. A non-oriented electrical steel sheet comprising a chemical composition containing, in mass %, C: 0.0050% or less, Si: 2.0% to 6.5%, Mn: 0.05% to 2.0%, P: 0.10% or less, S: 0.0050% or less, Al: 0.3% to 3.0%, N: 0.0050% or less, Co: 0.0005% to 0.0050%, Ti: 0.0030% or less, Nb: 0.0030% or less, and O: 0.0050% or less, with a balance consisting of Fe and inevitable impurities, wherein at at least one surface of the non-oriented electrical steel sheet, an amount of N existing as AlN in a range from the surface to a depth of 1/20 of a sheet thickness is 0.003 mass % or less, and the surface has an oxide layer containing one or both of Al and Si and having a thickness of 10 nm or more and less than 80 nm.

2. The non-oriented electrical steel sheet according to claim 1, wherein a Si concentration in the oxide layer is 12 at % or more.

3. The non-oriented electrical steel sheet according to claim 1, wherein the chemical composition further contains, in mass %, one or more groups out of the following groups A to F:

group A: one or both of Sn: 0.005% to 0.20% and Sb: 0.005% to 0.20%, group B: at least one selected from the group consisting of Ca, Mg, and REM: 0.0005% to 0.020% in total, group C: at least one selected from the group consisting of Cu, Cr, and Ni: 0.03% to 1.0% in total, group D: one or both of Ge and Ga: 0.0005% to 0.01% in total, group E: Zn: 0.001% to 0.05%, and group F: one or both of Mo and W: 0.001% to 0.05% in total.

4. The non-oriented electrical steel sheet according to claim 2, wherein the chemical composition further contains, in mass %, one or more groups out of the following groups A to F:

group A: one or both of Sn: 0.005% to 0.20% and Sb: 0.005% to 0.20%, group B: at least one selected from the group consisting of Ca, Mg, and REM: 0.0005% to 0.020% in total, group C: at least one selected from the group consisting of Cu, Cr, and Ni: 0.03% to 1.0% in total, group D: one or both of Ge and Ga: 0.0005% to 0.01% in total, group E: Zn: 0.001% to 0.05%, and group F: one or both of Mo and W: 0.001% to 0.05% in total.

5. A method of producing a non-oriented electrical steel sheet, the method comprising:

subjecting a steel material to cold rolling once or twice or more with intermediate annealing therebetween to obtain a cold-rolled steel sheet, the steel material having a chemical composition containing, in mass %, C: 0.0050% or less, Si: 2.0% to 6.5%, Mn: 0.05% to 2.0%, P: 0.10% or less, S: 0.0050% or less, Al: 0.3% to 3.0%, N: 0.0050% or less, Co: 0.0005% to 0.0050%, Ti: 0.0030% or less, Nb: 0.0030% or less, and O: 0.0050% or less, with a balance consisting of Fe and inevitable impurities;

subjecting the cold-rolled steel sheet to final annealing to produce a non-oriented electrical steel sheet; and subjecting, after the cold rolling and before the final annealing, a surface of the steel sheet to acidizing for 1 second to 60 seconds using an acid containing at least one selected from the group consisting of hydrochloric acid, phosphoric acid, sulfuric acid, and nitric acid at a total concentration of 3 wt % to 30 wt %.

6. The method of producing a non-oriented electrical steel sheet according to claim 5, comprising:

subjecting, before the cold rolling, the steel material to hot rolling to obtain a hot-rolled steel sheet; and subjecting the hot-rolled steel sheet to hot-rolled sheet annealing to obtain a hot-rolled and annealed sheet, wherein the hot-rolled and annealed sheet is subjected to the cold rolling.

7. The method of producing a non-oriented electrical steel sheet according to claim 5, wherein the chemical composition further contains, in mass %, one or more groups out of the following groups A to F:

group A: one or both of Sn: 0.005% to 0.20% and Sb: 0.005% to 0.20%, group B: at least one selected from the group consisting of Ca, Mg, and REM: 0.0005% to 0.020% in total, group C: at least one selected from the group consisting of Cu, Cr, and Ni: 0.03% to 1.0% in total, group D: one or both of Ge and Ga: 0.0005% to 0.01% in total, group E: Zn: 0.001% to 0.05%, and group F: one or both of Mo and W: 0.001% to 0.05% in total.

8. The method of producing a non-oriented electrical steel sheet according to claim 6, wherein the chemical composition further contains, in mass %, one or more groups out of the following groups A to F:

group A: one or both of Sn: 0.005% to 0.20% and Sb: 0.005% to 0.20%, group B: at least one selected from the group consisting of Ca, Mg, and REM: 0.0005% to 0.020% in total, group C: at least one selected from the group consisting of Cu, Cr, and Ni: 0.03% to 1.0% in total, group D: one or both of Ge and Ga: 0.0005% to 0.01% in total, group E: Zn: 0.001% to 0.05%, and group F: one or both of Mo and W: 0.001% to 0.05% in total.

* * * * *